United States Patent [19]

Hauschild et al.

[11] 4,106,922
[45] Aug. 15, 1978

[54] ALKALINE DECOMPOSITION PROCESS FOR PRODUCING CALCINED PHOSPHATE FERTILIZER

[75] Inventors: Ulrich Hauschild, Hanover; Heinrich Roetger, Gehrden, both of Fed. Rep. of Germany

[73] Assignee: Kali-Chemie, Hanover, Fed. Rep. of Germany

[21] Appl. No.: 770,030

[22] Filed: Feb. 18, 1977

[30] Foreign Application Priority Data

Feb. 20, 1976 [DE] Fed. Rep. of Germany ....... 2606883

[51] Int. Cl.² ............................................. C05B 11/16
[52] U.S. Cl. ............................................ 71/42; 71/44; 71/47; 71/DIG. 3; 423/167; 423/206 T
[58] Field of Search ................ 423/167, 206 T; 71/42, 71/44, 45, 47, DIG. 3

[56] References Cited

U.S. PATENT DOCUMENTS

| 3,336,104 | 8/1967 | Miller ................................ 423/206 T |
| 3,719,464 | 3/1973 | Hauschild et al. ................... 71/47 X |
| 3,904,733 | 9/1975 | Gancy et al. ...................... 423/206 T |
| 3,907,538 | 9/1975 | Hauschild ............................... 71/34 |
| 3,985,537 | 10/1976 | Hauschild et al. .................. 71/47 X |

*Primary Examiner*—Ferris H. Lander
*Attorney, Agent, or Firm*—Bacon & Thomas

[57] ABSTRACT

A process for the production of highly citrate-soluble calcined phosphate fertilizers is disclosed. The process comprises calcinating a mixture which comprises appropriate amounts of calcium phosphates, silicic acid and an alkaline decomposing agent whereby the naturally occurring mineral trona is used as an alkaline decomposing agent. The process is effected in a rotary kiln; the maximum temperature is about 1300° C.

11 Claims, No Drawings

ALKALINE DECOMPOSITION PROCESS FOR PRODUCING CALCINED PHOSPHATE FERTILIZER

BACKGROUND OF THE INVENTION

The present invention relates to a process for producing a calcined phosphate fertilizer, which is soluble in a citrate solution.

It is well known that the naturally occurring calcium phosphates which are found in the different parts of the world can be transferred into phosphate fertilizers, which are highly soluble in citrate solutions, by alkaline calcination decomposition. The principle procedure for the preparation of such alkaline high temperature phosphates is known already from the U.S. Pat. No. 1,799,882. This procedure comprises subjecting a mixture of raw natural phosphates, alkali carbonate and silicic acid to calcination in a rotary kiln at temperatures of above 1100° C. Within the mixture which is to be calcinated, the proportions of the different components are chosen such that at least 1 mole of alkali oxide is included per mole of $P_2O_5$. The added amount of silicic acid is portioned so that calcium orthosilicate may be formed therefrom by binding an equimolar amount of CaO from the tricalcium phosphate, which is present in the starting material and from the lime which is not bonded to phosphoric acid. The reaction which is assumingly taking place during such a process can be represented by the following equation:

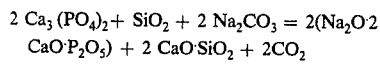

$$2\,Ca_3(PO_4)_2 + SiO_2 + 2\,Na_2CO_3 = 2(Na_2O\cdot2\,CaO\cdot P_2O_5) + 2\,CaO\cdot SiO_2 + 2CO_2$$

Later studies revealed that in order to accomplish a complete alkaline high temperature decomposition of the naturally occurring raw phosphates which contain a major portion of fluoroapatite, it is advantageous if the molar ratio between the $P_2O_5$, which is present in the raw phosphate and the alkali oxide which is used as a decomposing agent, is from 1:1 to 1:1.8. The decomposition is promoted by the presence of steam, whereby the latter can be provided by using fuels which are rich in hydrogen, especially fuel oil, as a combustible for producing the high temperature which is necessary for the decomposition process. For more than 50 years, calcium-sodium-silicophosphate, the phosphate component of which is plant-available on practically all types of cultivated soils, has been produced in this way using technical grade calcinated soda. Generally the quality, that is, the fertilizer activity of such high temperature phosphates is determined by the determination of the $P_2O_5$ solubility in a test solution according to Petermann, in a neutral solution of ammonium citrate and in a 2% citric acid solution, whereby the first of these methods is preferred.

More recently, in addition to soda, aqueous solutions of alkali hydroxides have also been used commercially as decomposition agents. It has been found that alkali hydroxide solutions can also be used in a rotary kiln if a calcinatable agglomerate is prepared in a suitable manner from the raw phosphates, the necessary amount of silicic acid and the alkali hydroxide solution. According to the method which is disclosed in U.S. Pat. No. 3,985,537, it is even possible to introduce all the alkali hydroxide solutions, which are necessary for the decomposition, directly into the rotary kiln. Such a process can be performed economically if the alkali hydroxide solutions are available at low cost.

Ever since the alkaline decomposition process for producing alkaline calcinated phosphates was discovered, efforts have been made to lower the considerable costs with which the process is charged due to the use of relatively large amounts of alkaline decomposing agents. Thus, some years ago it has been tried to effect the decomposition of the raw phosphate by using naturally occurring alkali-containing silicates such as feldspar, phonolithe or leucite, together with fresh lime in such a way as to obtain an inexpensive fertilizer (see German Pat. No. 288,089). Yet the amounts of silicates, as well as the necessary amounts of lime which had to be applied, proved to be so high that the final products contained only about 12% of $P_2O_5$ on the average. Furthermore, the $P_2O_5$ solubilities in the test solution according to Petermann, were about 50%. Therefore, these products could not compare with other fertilizers.

Numerous efforts to use other natural products which contain alkali oxide generating compounds, as decomposing agents, gave unsatisfactory results. Using alkali chlorides and/or alkali sulfates did not prove satisfactory because thereby large amounts of highly corrosive contaminated hydrochloric or sulfurous acids occurred. Other decomposing agents have been proposed, such as alkali-containing waste liquids which are obtained from the decomposition of cellulose-containing materials like wood, molasses bottom products, or alkali-containing slags from the iron and steel industry. The use of any of these decomposing agents was troublesome and did not yield satisfactory results. Despite many proposals, no other alkali yielding materials have yet been found which do not influence the quality of the final product and which are less costly than those which were mentioned above. Because of the need for adding high amounts of other compounds, mostly lime, and of technical difficulties during the preparation and working up of the resulting products, these processes never became technically important.

SUMMARY OF THE INVENTION

It is an object of the present invention to provide an alkaline decomposition process for producing calcined phosphates, which exhibit a high fertilizer activity wherein an inexpensive alkaline decomposing agent is used. It is a further object of this invention to provide such a process wherein a naturally occurring mineral is used as an alkaline decomposing agent, especially a mineral which is readily available at low cost and which favorably influences the calcination process and the qualities of the final product.

It is a further object of this invention to provide such a process which does not require adding high amounts of additional minerals.

In order to accomplish the foregoing objects according to the present invention, there is provided a process for producing a calcined phosphate fertilizer agent which is highly soluble in a citrate solution which comprises the step of calcinating a mixture comprising a calcium phosphate, usually a naturally occurring calcium phosphate, silicic acid and naturally occurring trona. The proportions of the components in the above mixture preferably are chosen as to provide for a per weight ratio $P_2O_5{:}Na_2O$ between 1:0.45 and 1:0.7, and the per weight ratio $P_2O_5{:}SiO_2$ between 1:0.2 and 1:0.5. The calcination temperature is preferably between about 900° and about 1300° C.

DETAILED DESCRIPTION OF THE INVENTION

It has been found that a mineral which naturally occurs in large amounts is extremely well suited to be used within the high temperature phosphate decomposition process without requiring the admixture of high amounts of other additional compounds. This is surprising, considering the above-mentioned experiences. The mineral which is known as trona comprises $NaHCO_3^-$ $Na_2CO_3 \cdot 2H_2O$ as its major component and in addition thereto, always comprises secondary components or impurities, respectively, of different types depending on the provenance of the product. Large deposits of trona are found, e.g., in the western states of North America, in exploitable deposits, as well as in numerous soda salt lakes, thus in the Ragtown lakes in Nevada or at the Owens lake in California. Such deposits also occur in Central America, South America, Asia, and Africa. The secondary components or impurities, respectively, which are present in the trona may comprise, e.g., other alkali salts, alkaline earth metal carbonates, clay, silicates and often organic compounds.

The advantages which can be achieved by using trona result from its not being hygroscopic and from the fact that this mineral can easily be ground. These properties, together with the good pourability of the ground material, provide for a working without difficulty during the entire high temperature phosphate decomposition process. Contrary to this, when normal technical soda is used, this soda causes considerable difficulties because of its hygroscopicity and its fine grains. Trona has the further advantage that it can be used without prior removal of its secondary components which usually amount to 5 to 10% of the mineral, but sometimes up to 20% or more. It is to be noted that no special care has to be taken because of these components. Their composition is such that they do not in any way disturb the process in the furnace and do not essentially influence the quality of the final product with regard to its chemical composition or its fertilizer activity. Since the naturally occurring trona can be used as such without any additional purifying operations, an extremely inexpensive decomposing agent is now available. This is even more surprising since this mineral is known to require extensive purifying operations prior to any industrial application.

Trona often contains organic compounds such as pitch blende or the so called oil shale. The presence of such a high boiling organic substance (0,1 to 3, sometimes up to 10%) represents an additional advantage for the high temperature decomposition process in the rotary kiln because, by the combustion of these substances, energy costs can be saved and furthermore a pre-reaction occurs within the mixture prior to reaching the calcination zone. This pre-reaction favorably influences the entire course of the calcination process. Thus, for example, the inclination for forming deposits on the furnace walls is strongly reduced. In order to accomplish the same effect in the rotary kiln expensive fuels would otherwise have to be mixed with the mixture of raw materials and be distributed finely therein.

Trona can be used as decomposing agents within the usual rotary kiln. Within the mixture of starting materials, the same molar ratio or per weight ratio, respectively, between $P_2O_5$ and $Na_2O$ or between $P_2O_5$ and $SiO_2$, respectively, are used as are used in conventional alkaline decomposition processes. The phosphate which emerges from the furnace is cooled, broken and ground. After mixing it with other nutrient carriers, e.g., potassium salts, and subsequent granulation, it can be directly marketed as a highly valuable fertilizer. Depending on the type of raw phosphate which is used, the high temperature phosphate may contain 24 to 30% $P_2O_5$, 14 to 21% $Na_2O$ and 31 to 40% CaO. Usually more than 97% of the $P_2O_5$ is soluble in a test solution according to Petermann, in a 2% citric acid solution and in a neutral ammonium citrate solution. Moreover, the CaO is present in an active alkaline form and therefore this fertilizer is especially suited for soils which are deficient in lime.

The use of trona within the preparation of high temperature phosphates will now be described by the following examples which are intended to be illustrative only.

EXAMPLE 1

1000 parts by weight of kola-apatite containing 39.1% $P_2O_5$, 570 parts by weight of ground trona from Wyoming/USA containing 37.9% $Na_2O$, 8% water insoluble solids and about 1% of combustible organic components, and 106 parts by weight of sand are mixed, whereby no loss of trona by dust forming occurs. The mixture is introduced into a rotary kiln which is directly heated by means of an oil burner and is heated up to a maximum temperature of 1220° C.

Because of the combustion of the organic secondary components in the mixture close to the furnace inlet, a pre-calcination occurs already in the cooler part of the furnace. During the entire passage through the furnace no difficulties such as deposits on the furnace walls or clogging occur. Compared to a decomposition process using technical grade soda, a lower amount of fuel is needed. The calcinated product is easy to grind and contains 28.85% $P_2O_5$, 16.6% $Na_2O$ and 38.6% CaO. Of its $P_2O_5$ content, 98.3% is soluble in a test solution according to Petermann, 98.8% in a neutral citrate solution and 100% in a 2% citric acid solution.

EXAMPLE 2

A mixture of 1000 parts by weight of pebble-phosphate from Florida containing 30.1% $P_2O_5$ and 500 parts by weight of ground trona having the same composition as the trona of Example 1, is introduced into a directly heated rotary kiln and is slowly heated to a maximum temperature of 1150° C. There are no deposits on the furnace walls and no clogging, forming of big lumps or the like which can be noticed when common technical grade soda is used as a decomposing agent.

The resulting high temperature phosphate contains 26.2% $P_2O_5$, 16.9% $Na_2O$ and 39.6% CaO, whereby the $P_2O_5$ solubility is 99.6% in a solution according to Petermann and 100% in a 2% citric acid solution.

EXAMPLE 3

Like in the previous examples, a rotary kiln is used for the high temperature decomposition process. A mixture of 1000 parts by weight of a North African raw phosphate containing 37.4% $P_2O_5$, 582 parts by weight of ground trona having the same composition as described in Example 1, and 84 parts by weight of quartz sand are introduced into the furnace and heated up to a maximum temperature of 1200° C without any difficulties occurring during the passage through the furnace.

The calcinated product contains 27.8% $P_2O_5$, 17.1% $Na_2O$ and 39.4% CaO. Of its $P_2O_5$ content, 99.4% are soluble in a test solution according to Petermann and 100% in a 2% citric acid solution.

EXAMPLE 4

1000 parts by weight of raw phosphate from Wyoming/USA containing 32.8% $P_2O_5$, 526 parts by weight of trona containing 37.7% $NaO_2$, 8.8% of water insoluble components and minor amounts of organic substances are thoroughly mixed and heated up to a temperature of 1180° C in a rotary kiln without any deposits on the furnace wall occurring.

The results product contains 26.5% $P_2O_5$, 16.6% $Na_2O$ and 38.8% CaO. The $P_2O_5$ solubility is 99.2% in a test solution according to Petermann and 99.8% in a 2% citric acid solution.

What is claimed is:

1. In an alkaline high temperature decomposition process for producing a calcined citrate-soluble alkali-containing phosphate fertilizer, which comprises the step of calcining in a rotary kiln at a temperature of between about 900° and 1300° C, a mixture comprising a raw calcium phosphate, an alkali-metal-oxide supplying compound and silicic acid in such amounts that the molar ratio between the phosphate and the alkali metal oxidesupplying compound is equivalent to a per weight ratio $P_2O_5$:$Na_2O$ of between about 1:0.45 and about 1:0.7 and the amount of silicic acid is sufficient to bind an excess of calcium, the improvement, which comprises said alkali metal oxide-supplying compound, consisting essentially of the naturally occuring mineral trona.

2. The process as defined in claim 1, wherein the calcium phosphate is comprised of a naturally occurring calcium phosphate containing mineral.

3. The process as defined in claim 1, wherein in said mixture, phosphate and silicic acid are present in such amounts that the per weight ratio between the components is equivalent to a per weight ratio $P_2O_5$:$SiO_2$ between about 1:0.2 and about 1:0.5.

4. The process as defined in claim 1, wherein at least part of the silicic acid is comprised of a mineral chosen from the group of trona and calcium phosphate containing minerals.

5. The process as defined in claim 1, which further comprises the steps of breaking and grinding the phosphate material which results from the calcination and granulating the ground material.

6. The process as defined in claim 5, which further comprises the step of mixing additional fertilizing agents with the ground material prior to the granulation.

7. The process as defined in claim 6, wherein said additional fertilizing agents comprise potassium salts.

8. The process as defined in claim 1, wherein the trona comprises at least about 80% of $NaHCO_3 \cdot Na_2CO_3 \cdot 2H_2O$.

9. The process as defined in claim 8, wherein the trona further comprises combustible organic compounds as secondary components.

10. The process as defined in claim 8, wherein the trona comprises an alkali content which is equivalent to from about 32 to 42% $Na_2O$.

11. The process as defined in claim 10, wherein the trona comprises from about 0,1 to 3% of combustible organic compounds.

* * * * *